June 1, 1965  J. W. ANGELL  3,186,172
VARIABLE RATIO FLUID DRIVE
Filed Sept. 5, 1963  3 Sheets-Sheet 1

INVENTOR.
JAMES W. ANGELL
BY

ATTORNEYS

June 1, 1965    J. W. ANGELL    3,186,172
VARIABLE RATIO FLUID DRIVE
Filed Sept. 5, 1963
3 Sheets-Sheet 3
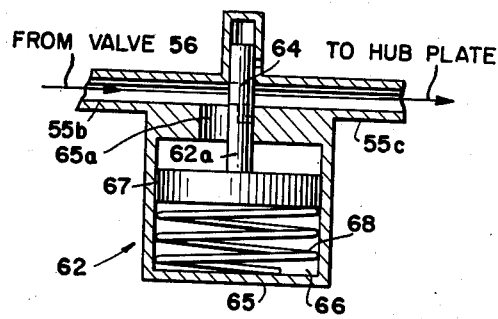
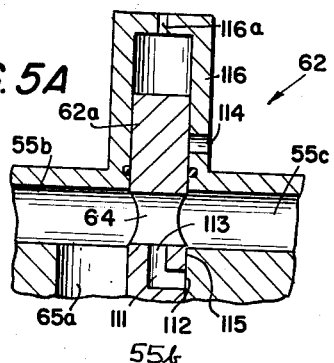
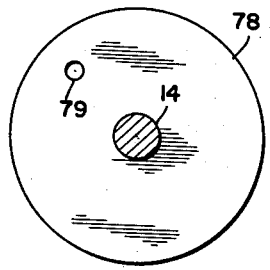
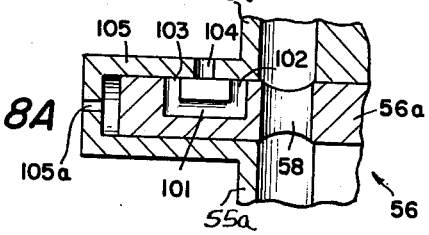
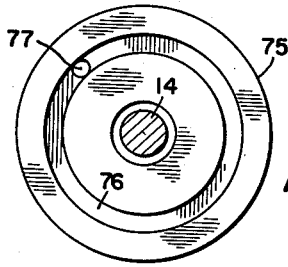
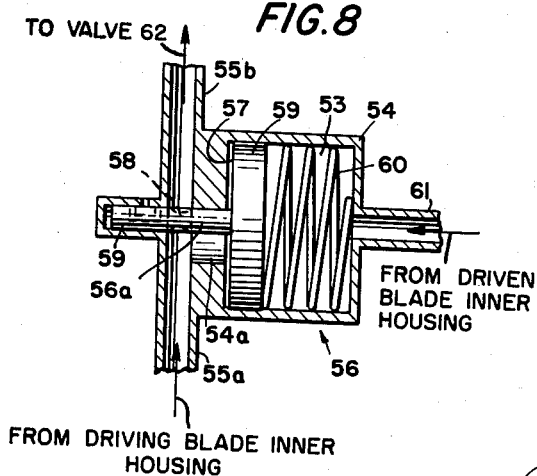
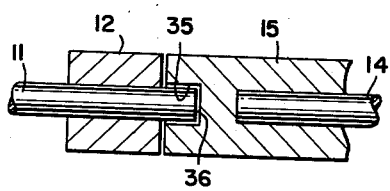
INVENTOR.
JAMES W. ANGELL
BY
ATTORNEYS

3,186,172
VARIABLE RATIO FLUID DRIVE
James W. Angell, 1136 Fifth Ave., New York 28, N.Y.
Filed Sept. 5, 1963, Ser. No. 306,900
14 Claims. (Cl. 60—54)

This invention relates to fluid drive transmissions and, in particular, to a self-adjusting variable ratio fluid drive for transmitting rotary power from a driving shaft to a driven shaft.

The fluid drive of the present invention includes a fluid impelling rotor for circulating an impelling fluid in a closed path within a housing and a rotor driven by the impelling fluid in which at least one of said rotors carries blades of variable pitch with respect to the path of flow of the impelling fluid which pitch varies in response to changes in the load on the driven rotor, changes in the speed of rotation of the impelling rotor and changes in the differential speeds of the impelling and driven rotors. The fluid drive is particularly suited as a transmission for automobiles, but may have numerous other applications.

In the preferred embodiment of the invention, the driving blades are fixed rigidly to the driving shaft, and, when rotated, impel fluid against the blades of the driven rotor. The impact of this moving fluid against the pitched or angled blades of the driven rotor tends to rotate the driven shaft in the same direction as the driving rotor.

This novel fluid drive works fully automatically and contains numerous advantages not to be found in the prior art systems. For example, this invention automatically provides for the equivalent of a gear reduction in gear transmission drives when circumstances are presented wherein the load on the driven shaft becomes quite large with respect to the power input, as in the case when a car suddenly meets a hill and the power setting remains constant. Under these circumstances the effective surface area of the driven blades (that is, the projected area of the blades in a plane perpendicular to the flow of the impelling fluid) decreases and the differential speeds of the driving and driven blades increase. Thus, in this case of increasing load conditions, the torque delivered by the driven shaft is increased for any constant throttle setting, although the rotational speed of the driven shaft is diminished.

This invention thus provides a system wherein the angle of the driven blades will vary in proportion to the increasing and decreasing of the load on the driven shaft. In the case where the load is increasing, this operation generally simulates the changing to a lower gear with a standard transmission.

In another situation where the load remains constant and the power input to the driving shaft is suddenly increased, as in the case when a vehicle is accelerated rapidly, the same general gear reduction operation will begin to take effect. In other words, the driven blades will be adjusted temporarily to decrease the effective surface area which they present to the flow of the impelling fluid and the differential speeds will increase so that increased torque can be delivered to the driven blades until the desired increased velocity of the driven shaft and the vehicle is achieved.

Although the gear reduction operation begins during the initial stages of rapid acceleration, the effect of decreasing the angle of resistance of the driven blade, which tends to lower the speed, will be more than offset by the simultaneous large increases both in the number of power impulses received by each driven blade on each revolution, and in the force or energy of each impulse. Thus, the speed of rotation of the driven blade will also sharply increase. The net result will be a quick increase in the torque power delivered from the engine to the rear wheels and a quick increase in the road speed of the car itself. This provides the fast acceleration so prized by modern drivers.

Since, however, this increase in torque and decrease in the relative speed of the driven shaft is unnecessary or undesirable at higher operational speeds, this invention provides for a gear increase operation which goes in effect when the speed of the driving shaft is above a certain predetermined magnitude which can be correlated with a predetermined road speed for the vehicle. When this predetermined rotational speed or road speed has been exceeded, and the difference in magnitude between the rotational speeds of the driven shaft and the driving shaft are within a predetermined amount, gear increase means are put into effect which increases the effective area of the driven blades. The force exerted on the driven blades by the gear increase means varies with the rotational speed of the driving shaft. If the speed of the driving shaft is increased, as when it is desired to travel faster, the angle of the driven blades will be forced back to the original full power position and the fluid drive itself will reach the equivalent of high gear in the standard transmission. This gear increase operation will remain in effect as long as the car speed is above a predetermined level, and as long as the road remains relatively flat and the throttle setting remains in its increased position.

Thus, the fluid drive described in this invention not only provides means for increased acceleration, but, in addition, provides a fluid drive system for automatically and efficiently changing to a high gear ratio once a predetermined driving shaft speed has been obtained and the increased leverage of a low gear ratio is no longer needed.

This fluid drive gear increase operation is not limited to periods of sudden acceleration or increasing power input. On the contrary, this invention automatically keeps the drive as a whole in the equivalent of a high gear position when the vehicle speed is above a predetermined amount, say 25 m.p.h., over flat or relatively moderate hilly roads. The varying increases and decreases in load caused by these conditions may be overcome by appropriate variances in power input and without changing from this high gear ratio position. This inhibition or prevention of the gear reduction operation cannot be achieved automatically by any of the existing fluid drives.

If, however, conditions are met which increase the load on the driven shaft to extremely high values, the rotational speed of the driven shaft will fall below the speed of the driving shaft by a predetermined differential value. When this occurs, the gear increase means is automatically removed from the system and the driven blades are once again allowed to yield freely to the impelled fluid flow. Later, when the rotational speed of the driven shaft comes within a predetermined magnitude of the rotational speed of the driving shaft, the gear increase means will again come into operation, if, of course, the road speed is above a predetermined value, say 25 m.p.h.

This cutting-off operation of the gear increase means automatically allows the fluid drive to effectively shift into a lower gear when severe load conditions are met, such as when a vehicle is climbing a steep hill. Without this added feature the fluid drive would be put into the equivalent of high gear in an ordinary transmission when it was on a hill. This is obviously the wrong change. In this invention the gear reduction effect goes into operation on the hill, thus automatically giving the engine maximum power and torque which it needs to overcome it.

The new fluid drive disclosed in this invention has numerous further advantages, such as providing an infinitely continuous range of possible ratios between the speed of the driving shaft and the speed of the driven shaft within desired limits. This is in sharp contrast with both standard and hydramatic transmissions where the possible gear ratios are limited usually to between three and six settings.

This invention provides a further advantage in that only a fraction of the total power generated by the engine is consumed in the operation of the drive itself by either friction or slippage of fluid between the driving and driven blades. The power losses are, thus, far less than in comparative hydramatic transmissions.

Another advantage is that this drive requires no periodic adjustments to keep it in operation.

Still further, this invention provides a transmission which is much lighter than the usual hydramatic types, weighing little more than standard transmission of equal capacity. Finally, this fluid drive is far simpler in construction and hence costs far less to manufacture than the hydramatic types.

Other objects, advantages, and a fuller understanding of this invention can be had by referring to the following description and claims taken in conjunction with the accompanying drawings in which:

FIGURE 5 is a cross-sectional side elevation of one of the valve control means;

FIGURE 5A is a detailed elevational view of a portion of the valve shown in FIGURE 5;

FIGURE 6 is a forward view of a rotating hub plate connected to the driven shaft;

FIGURE 7 is a rearward view of a non-rotating housing plate surrounding the driven shaft;

FIGURE 8 is a cross-sectional side elevation of another valve control means;

FIGURE 8A is a detailed elevational view of a portion of the valve shown in FIGURE 8; and FIGURE 9 is a cross-sectional side elevation of the adjacent ends of the driving shaft and the driven shaft.

Figure 1:
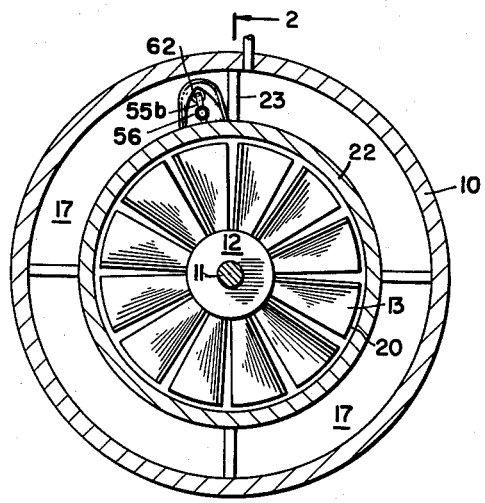
FIGURE 1 shows a front end cross-sectional view of the fluid drive transmission along line 1—1 in FIGURE 2.
Figure 2:
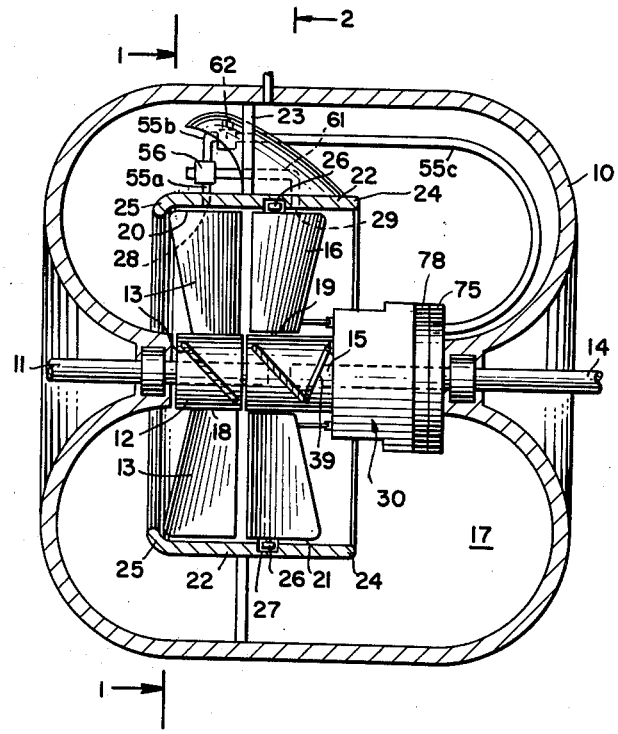
FIGURE 2 is a cross-sectional side elevation taken generally along line 2—2 in FIGURE 1.

With reference to the drawings the invention is illustrated as being incorporated within a generally torus housing indicated by the reference character 10. As illustrated in FIG. 2, driving shaft 11 enters housing 10, along its central axis, wherein the shaft terminates and is surrounded by hub 12. Driving blades 13 are rigidly connected to hub 12, making angles say 45°, with the axis of driving shaft 11. In the embodiment shown in FIG. 2, the driving blades 13 have been permanently fixed to the driving hub 12 although other embodiments are envisioned wherein the driving blades, instead of the driven blades, may adjust automatically in response to variations in fluid pressure.

Adjacent the end of driving shaft 11 is a driven shaft 14 around which a driven hub 15 is mounted. The hub 15 carries variable pitch blades 16 which are pivotally attached thereto in such a manner that they may respond to the various pressures of a drive fluid within a chamber 17 of the housing 10 as this fluid is impelled against the driven blades by the driving blades 13. The driving and driven blades 13 and 16 extend radially from generally narrow cross-sections 18 and 19 respectively, outwardly toward generally broad blade cross-sections 20 and 21. The ends 20 and 21 of the driving and driven blades terminate at approximately the same radial distance from the shafts and form two circular rotors.

Surrounding and generally adjacent the ends 20 and 21 of the driving and driven blades in an inner housing ring 22 which can generally be seen in FIG. 2. The inner housing ring 22 is rigidly attached to outer housing 10 by four support rods 23. This inner housing surrounds the outer ends of driving and driven blades 13 and 16, just clearing their radial extremities, while its central axis coincides with the axes of shafts 11 and 14. The ring 22 has a downstream end 24 which extends beyond the downstream edges of the blades 16 and an inwardly curved upstream end which encourages unidirectional flow through the ring, thus providing a close-fitting sleeve around the outer ends of the blades which assures that virtually all of the fluid impelled by the driving blades will be forced directly at the driven blades and will not escape centrifugally.

The inner surface of the housing ring 22 has a groove 27 formed therein which accommodates stabilizing ring 26 onto which the outer edges of the driven blades 16 are pivoted. This groove is positioned between two ports 28 and 29, as shown in FIG. 2, which pierce the ring 22. The purpose of the ports 28 and 29 will be explained below.

A control mechanism 30, the housing of which is shown in FIG. 2, governs the pitch or angle of the driven blades 16 with relation to the longitudinal axis of the driven shaft 14 and hence varies the effective area (projected area in a plane perpendicular to the flow of the impelling fluid) which the blades present to the flow of fluid impelled by the driving blades 13.

Figure 3:
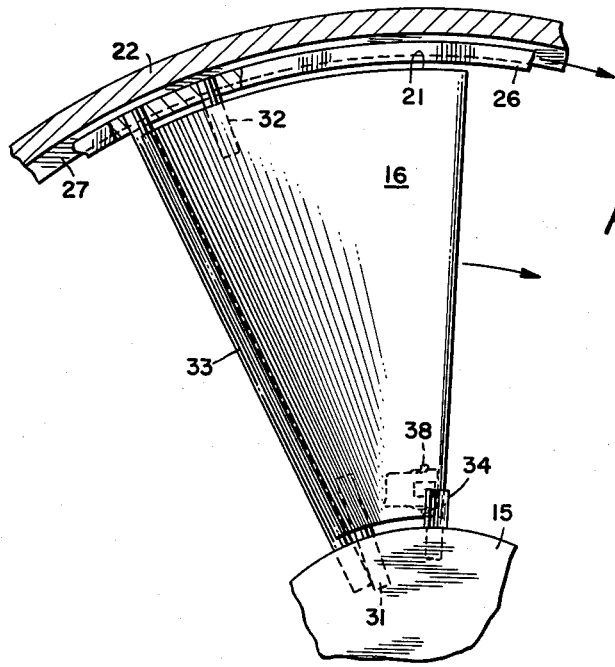
FIGURE 3 is a partial rearward view of one of the driven blades and its supporting elements.
Figure 4:
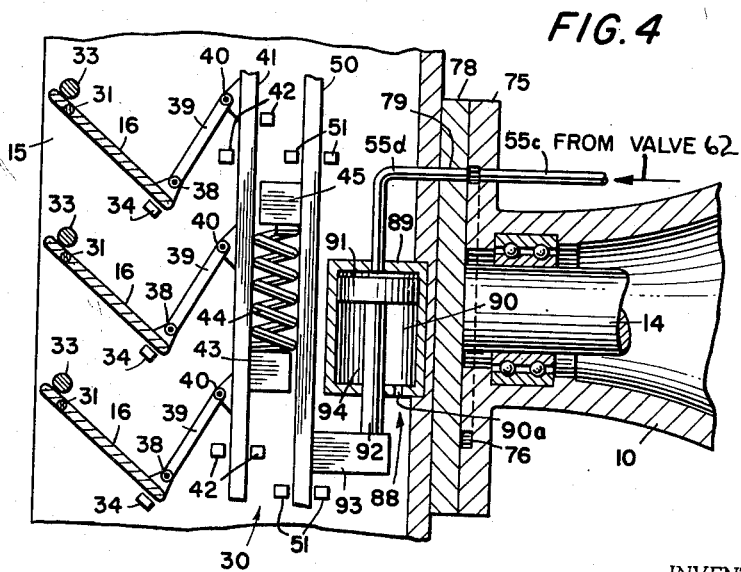
FIGURE 4 is a schematic elevational view partly in cross-section showing three of the driven blades and the driven blade controlling elements.

In the embodiment of the invention illustrated here, each driven blade is attached to the hub 15 by a pivot rod 31 near its leading edge as shown in FIGS. 3 and 4 and to the outer retaining ring 26 by a pivot rod 32. These two pivots 31 and 32 form a pivotal axis for the blade perpendicular to the longitudinal axis of the driven shaft.

The retaining ring 26 is stabilized by a series of connecting rods 33. These rods 33 are behind the driven blades, thereby offering the least resistance to the flow of fluid over the surface of the driven blades.

The rotation of the driven blades around their pivotal axes is however restricted. A lug 34 limits the clockwise rotation of each blade to a predetermined angle, say of about 45° with the axis of the driven shaft. At the same time other elements in the control mechanism 30 prevent the blade from rotating counterclockwise beyond a position roughly parallel with the driven shaft. Thus, the driven blades present a variable effective surface area to the flow of the impelling fluid. As the pitch angle of the variable pitch blades decreases with respect to the path of flow of the impelling fluid, the turning torque produced by the impelling fluid on the driven rotor decreases, and conversely, as the pitch angle increases, the turning torque increases.

On the lower back side of the trailing edge of each driven blade is a pivot support 38 holding connecting rod 39. At the other end of this rod is another pivot support 40 attached to the blade-angle control ring 41. The latter ring is mounted about hub 15 in a plane which is perpendicular to the driven shaft 14. This ring 41 fits around hub 15 closely, and, although it is carried by the rotating hub, it can be rotated with respect to it. This rotation, however, is always about the axis of the drive shaft 14. Control ring 41 is prevented from axial movement by guides 42 which are located on either side of the control ring as shown in FIG. 4.

A lug 43 is attached to control ring 41 on its far side away from driven blade 16 as shown in FIG. 4. The lug 43 holds one end of a compression spring 44, the other end of which spring is firmly placed within another lug 45, which, in turn, is attached to the inner side of a booster ring 50. As long as the position of the booster ring 50 and its lug 45 remain unchanged with relation to hub 15, the angle of the driven blade will be controlled solely by the resistive pressure exerted by compression spring 44.

In the non-operating position, assuming again that the position of the booster ring relative to the hub does not change, the pressure of the spring 44 holds the trailing edge of each driven blade firmly against the lug 34. Each driven blade is thus initially placed in a position parallel to the driving blades, making an angle of approximately 45° with the axis of the driven shaft.

During operation, however, the fluid impelled against the driven blades by the driving rotor tends to force each driven blade to pivot in a counterclockwise direction. This backward movement, in an axial direction, rotates the control ring 41 on the hub against the force exerted by the spring 44.

At low driving rotor speeds the resistance of the compression spring 44 will be sufficient to prevent any movement of the controlled blades 16. However, as the driving blade speed increases above some predetermined point, the spring will be compressed and the driven blades 16 will start to rotate counterclockwise about their pivots. At the extreme position, when the spring is completely compressed, the driven blades will be roughly parallel to the longitudinal axis of the driven shaft, presenting a reduced effective area to flow of the fluid impelled by the driving rotor. This rotation of the driven blades on their pivots produces the gear-reduction effect previously described.

At any constant rotational speed of the driving rotor, the rotational speed of the driven rotor will decrease as the effective area of the driven blade decreases. However, because of the increased differential speed between the two rotors each driven blade will then receive on each of its revolutions, more powered impulses from the blades of the driven rotor. The product of the number of power impulses multiplied by the blade speed remains constant. In effect, the leverage of the driving rotor, and hence of the engine, is increased.

In general, throughout the range of adjustment of the driven blades, a continuous range of gear ratios can be simulated. The drive will automatically select the most advantageous ratio, given the road conditions and the power input.

While each driven blade 16 is connected to the angle control ring 41 in this embodiment, only one spring 44 is used to govern the position of the ring itself. Other embodiments are envisioned which use two or more springs or use other types of resistive yielding elements. It is suggested that the spring 44 or other resistive element contemplated should be strong enough to hold the driven blades in their full-power position at low non-accelerating speeds, say, up to 25 m.p.h. on a flat road. Assuming other variables to be constant, the spring, at higher flat road speeds, will begin to be compressed in response to the increased pressure of fluid impelled by the driving rotor. The driven blades will, hence, begin to rotate axially, initially reducing their effective surface areas to the flow of fluid. The increased speed of the driving rotor, however, quickly brings valves 56 and 62 (described below) into operation, and in consequence the effective surface areas of the driven blades begins to increase. The critical speed of 25 m.p.h. here mentioned is purely illustrative, however, and the most desirable actual value will be determined by the specific type of vehicle and the terrain conditions in which it is to be used.

In the discussion above, it was assumed that the position of booster ring 50 with its spring retaining positioning lug 45 remained unchanged on the hub 15. In actual operation, however, the booster ring 50 can rotate on the hub 15 between guides 51 carried by the hub on both sides of the ring 50. The position of the booster ring 50 is controlled by centrifugal fluid pressure developed by the driving blades under the influence of a control system to be described below.

The port 28 in the annular housing 22 extends outwardly from the outer edges 20 of the blades 13. This port 28 is in pressure communication with a pressure controlled actuator 88 which adjusts the booster ring 50 rotationally on the hub 15. This pressure controlled actuator includes a housing 89 affixed to the hub 15, a chamber 90 defined within the housing, a movable piston 91 within the chamber and a piston rod 92 extending from the housing and engaging a lug 93 carried by the booster ring 50. The spring 44 normally maintains the piston in the position shown in FIGURE 4.

The port 28 communicates with the chamber 90 on the side of the piston opposite its piston rod, as best shown in FIGURES 2 and 4, through a pressure tubing 55a, a pressure controlled valve 56, a pressure tubing 55b, a pressure controlled valve 62, a pressure tubing 55c, a port 77 (see FIGURE 7) in a stationary plate 75 affixed to the housing 10, an annular passage or groove 76 in the inner face of the stationary plate 75, a port 79 (see FIGURE 6) in a rotary plate 78 carried by the driven shaft 14 and a pressure tubing 55d connecting the port 79 with the chamber 90. The abutting relationship of the fixed plate 75 and the rotary plate 78 maintains the annular passage 76 sealed, and this arrangement makes it possible to transmit pressure from the stationary port 28 to the pressure controlled actuator 88 carried by the driven shaft.

The other port 29 in the annular housing 22 extends outwardly from the outer edges 21 of the blades 16. The port 29 receives fluid under centrifugal pressure generated by the driven blades and is in pressure communication with a chamber 53 defined within a housing 54 which forms part of the valve 56. The chamber 54 accommodates a piston 59 which carries a piston rod 56a having a flow passage 58 therethrough. When the piston is in the position shown in FIGURE 8, the flow passage 58 is substantially in alignment with the pressure tubing 55a and 55b, permitting maximum flow. The compressed spring 60 within the chamber 53 and the pressure of the fluid introduced into the chamber through the pressure tubing 61 urge the piston to this position of maximum flow through the valve 56, whereas the pressure introduced into the chamber from the conduit 55a through the opening 54a exerts a force on the piston which tends to close the valve 56.

The valve 62 connecting the pressure tubing 55b and 55c includes a housing 65 having a chamber 66 defined therein, a movable piston 67 accommodated in the chamber 66, a rod 62a having a passage 64 therethrough for regulating the flow of fluid from the pressure tubing 55b to the pressure tubing 55c, a compressed spring 68 within the chamber 66 for exerting a force on the piston in one direction and an opening 65a in the housing for establishing communication between the pressure tubing 55b and the side of the piston opposite the compressed spring. When the valve 56 is open, the centrifugal fluid pressure developed by the driving blades 13 is transmitted to the piston 67 through the port 28 in the annular housing 22, the pressure tubing 55a, the open valve 56, the pressure tubing 55b and the opening 65a in the housing 65 to exert a force on the piston in opposition to the spring 68. When this force reaches a predetermined value, the passage 64 moves into alignment with the pressure tubing 55b and 55c, thereby opening the valve 62. The magnitude of this activating pressure is predetermined to correspond to the pressure developed when the car is being driven on a flat road at a predetermined speed of, say, twenty-five miles per hour. Of course, this same pressure may also be developed by the driving blades when they are rotating at the equivalent of this flat-road speed but under different load conditions.

It is clear that with appropriate design and seals, the fluid under pressure will be transferred without appreciable loss from aperture 77 to aperture 79, even though plate 75 is fixed and plate 78 is rotating rapidly. It is interesting to note that if any fluid were lost at this sealing point, it would merely dissipate into fluid area 17 within outer housing 10.

As discussed above, the fluid under pressure which is thus transmitted to the pressure controlled actuator 88 tends to displace the piston 91 and its rod 92 against the lug 93 of the booster ring 50, thus rotating the booster ring on the hub and displacing the spring retaining lug 45 to compress the spring 44. The compression of the spring 44, in turn, tends to impart rotation to the blade control ring 41 to adjust the blades 16 of the driven rotor to positions which increase their total effective areas. The driven blades 16 are thus forced toward their respective full-power positions by the above operation resulting in what is termed herein as a gear-increase effect.

Except as explained below, the movements of the booster ring assembly, described above, begin to take place when the engine speed rises above the predetermined level. At speeds below this predetermined speed, the valve 62 will close, cutting off the supply of high pressure fluid to the pressure controlled actuator 88, and the booster ring 50 will be free to return to its normal position under the influence of the spring 44. However, at the higher speeds of the engine, the pressure controlled actuator 88 increases the resistance offered by the spring 44 to the deflection of the blades 16 by the impelling fluid so that greater speed will be imparted to the vehicle.

The end of the chamber 90 opposite the end in pressure communication with the port 28 is vented at 90a, in order to permit unimpeded displacement of the piston 91 as it responds to the fluid pressure transmitted to it from the driving blades 13.

The weight of the pressure controlled actuator 88 might induce excessive vibrations in the driven shaft at higher speeds. It may, therefore, be desirable to place compensating weights on the opposite side of the driven hub 15, or to replace the actuator 88 with two or more smaller actuators positioned about the driven hub 15 to counterbalance each other.

The compression spring 68 of the valve 62 must obviously be strong enough to keep the valve closed when the engine and hence the driving rotor speeds are lower than what would suffice to drive the car at a predetermined speed, for example, twenty-five miles per hour on a flat road. Otherwise, the gear-increase effect would overpower the gear-reduction effect with highly undesirable results. Engine and driving rotor speeds substantially higher than the critical level for opening valve 62 will occur only when the car is (1) traveling on flat roads or over moderate hills at road speeds in excess of the predetermined speed, say twenty-five miles per hour, or (2) accelerated rapidly from low road speeds, or (3) climbing a steep hill at a low road speed but under full power.

The last two operating conditions at times require high torque outputs which normally would not be available with the gear increase means in operation and valve 62 open. Therefore this brings into play the cut-off valve 56 which stops the gear increase effect when the speed of the driving shaft exceeds the speed of the driven shaft by a predetermined amount. Toward this end, if the force exerted by the centrifugal fluid pressure generated by the driving blades 13 on the piston 59 overcomes the combined forces of the spring 60 and the centrifugal fluid pressure generated by the driven blades 16 on the piston 59, the valve 56 will close, stopping the gear increase effect. The spring 60 has sufficient strength to hold the valve open by itself whenever the engine speed, and hence the driving rotor speed, are less than that which would produce a flat road car speed of a predetermined magnitude. At higher engine and driving rotor speeds, the opening or closing of the valve will depend not only on the strength of the spring, but also on the relation between the magnitudes of the fluid pressures developed on both sides of the piston by the driving and driven blades, respectively. Thus, through this operation of the valve 56, this invention provides a second means for stopping the gear increase effect when high torque operation is desirable in view of the relation between the power input and the present load conditions.

In order to permit a quick return of the piston 91 of the pressure controlled actuator 88 to its original or normal position when either of the valves 56 and 62 is closed, the valves 56 and 62 include escape paths for relieving the pressure transmitted to the pressure controlled actuator.

In valve 56, as shown in FIG. 8A, fluid relief passage 101 is located in the end of the valve stem 56a proceeding from aperture 102 to aperture 103. In the position shown in FIG. 8A, where the valve is open, the apertures 102 and 103 are flush against casing wall 105. Located between apertures 102 and 103 within this outer wall 105 is a vent 104 which communicates with the fluid chamber 17. Thus, when the valve is open, vent 104 is closed by the valve stem 56a. However, when valve stem 56a is displaced to the right, closing the valve, aperture 103 moves to a position opposite the vent 104 and aperture 102 moves into communication with the pressure tube 55b. Thus, when the valve 56 closes, the fluid under pressure in passage 55b is relieved through passage 101 into area 17 within outer housing 10.

Similarly, in valve 62 the valve stem 62a contains a passage 111 which runs between aperture 112 and aperture 113. When valve 62 is in the open position, aperture 112 is closed by the outer casing wall 115, while the aperture 113 leads directly into the valve passage 64 as shown in FIG. 5A. A vent 114 leading to the fluid chamber 17 is located in the cylinder wall 116 and is closed by the upper portion of valve stem 62a when valve 62 is in the open position. When the valve 62 closes, the aperture 112 moves into communication with the pressure tubing 55c and the passage 64 moves into alignment with the vent 114. Thus, when valve 62 is closed, the fluid within the pressure tubing 55c is relieved through the passage 111 and the vent 114.

It should be noted that the ends of the casing walls 105 and 116 of the valves 56 and 62, respectively, are vented at 105a and 116a, respectively, so that the displacement of the valves will not be impeded as the valve stems 56a and 62a travel toward the ends of the wall casings.

Other embodiments are contemplated which could use electrical means for activating relief valves located remotely from valves 56 and 62.

It should be noted that if the driven rotor speed exceeds the driving rotor speed by a substantial margin, as is the case when the car is rolling rapidly down a hill with the engine idling or shut off, the new drive enables the engine to act as a positive brake. In this case the driven blades will be in their full power position. Thus, the driven blades will encounter the maximum resistance to their own rotation because they are forced to turn the driving blades and the entire driving shaft.

Although no provision has been made above for reversing the drive, a simple clutch and reverse gear can obviously be attached to the driven shaft. Moreover, by utilizing the pressure of the fluid expelled from the ends 20 of the driving blades into the port 28, the reverse gear can be made power-operated. The necessary devices are obvious and need not be described in detail.

More flexibility can be achieved by adding a second unit consisting of an additional pressure controller actuator 88 and another booster ring assembly 30. This would permit the first assembly to operate at lower fluid pressures than those now contemplated, and the new assembly at somewhat higher pressures. The piston of the pressure controlled actuator in the second assembly would operate against the top of the cylinder 89 in the first assembly. The cylinder in the second assembly would be mounted rigidly on the hub 15, but the cylinder in the first assembly would be mounted on a ring which could itself rotate around the hub like the present booster ring. The details of this alternative embodiment are self evident and need not be elaborated.

Finally, FIG. 9 shows a simple arrangement for aligning the driving and driven shafts 11 and 14. A projection or stud 35 on the end of the driving shaft 11 is received by recess 36 in the driven hub 15. Projection 35 fits snugly within this recess although it is free to rotate in either direction. Bearings will, of course, be necessary to insure proper rotation although they are not shown in FIG. 9.

Although the invention has been described in detail, it is understood that this disclosure has been made only by way of example and that numerous modifications and variations can be made without departing from the spirit and scope of the invention as hereinafter claimed.

I claim:

1. A fluid drive apparatus comprising a housing containing an impelling fluid, a fluid impelling rotor within said housing for circulating the impelling fluid, a rotor driven by said impelling fluid, at least one of the rotors carrying blades of variable pitch with respect to the path of flow of the impelling fluid, resilient means biasing the variable pitch blades to positions of maximum pitch with respect to the flow of the impelling fluid and resisting a reduction in the pitch of said variable pitch blades to the flow of the impelling fluid, and means responsive to an increase in speed of the impeller for increasing the resistance offered by the resilient means to a reduction in the pitch of the variable pitch blades to the flow of the impelling fluid.

2. A fluid drive apparatus as set forth in claim 1 including means controlled by a reduction in the speed of rotation of the driven rotor for rendering inoperative said means controlled by an increase in speed of the impeller.

3. A fluid drive apparatus comprising a housing containing an impelling fluid, a fluid impelling rotor within said housing for circulating the fluid, a rotor driven by said impelling fluid, a plurality of variable pitch blades carried by one of said rotors, means urging the variable pitch blades toward positions of greater pitch with respect to the path of flow of the impelling fluid, actuatable means to increase the force urging the variable pitch blades toward positions of greater pitch with respect to the path of flow of the impelling fluid, and control means responsive to an increase in the speed of said driven rotor in relation to the speed of the fluid impelling rotor for rendering operative the said actuatable means.

4. A fluid drive apparatus as set forth in claim 3 in which said actuatable means is pressure-actuated and in which said control means includes a conduit establishing communication between said actuatable means and a source of pressure which varies with the speed of rotation of the fluid impelling rotor, valve means in said conduit, and means controlled by the difference in the centrifugal pressures at the impelling rotor and the driven rotor for opening and closing said valve.

5. A fluid drive apparatus comprising a housing containing an impelling fluid, a fluid impelling rotor within said housing for circulating the fluid, a rotor driven by said impelling fluid, a plurality of variable pitch blades carried by at least one of said rotors, means urging the variable pitch blades toward positions of greater pitch with respect to the path of flow of the impelling fluid and control means operating in response to an increase in the speed of the fluid impelling rotor when the speed of the driven rotor is above a predetermined level in relation to the speed of the fluid impelling rotor for exerting an increased force on the variable pitch blades which tends to increase the pitch of the variable pitch blades with respect to the path of flow of the impelling fluid.

6. A fluid drive apparatus as set forth in claim 5 in which said control means includes pressure-actuated means for exerting said increased force on the variable pitch blades, fluid pressure-transmitting means for establishing communication between said pressure actuating means and a source of pressure which varies with the speed of the fluid impelling rotor, and means controlled by a source of pressure which varies with the speed of the driven rotor for rendering operative said fluid pressure transmitting means when the speed of the driven rotor rises above a predetermined level in relation to the speed of the fluid impelling rotor and for rendering inoperative said fluid pressure transmitting means when the speed of the driven rotor falls below a predetermined level in relation to the speed of the fluid impelling rotor.

7. A fluid drive apparatus comprising a housing containing an impelling fluid, a fluid impelling rotor within the housing for circulating the fluid, a rotor driven by the impelling fluid, a plurality of variable pitch blades carried by at least one of said rotors, yielding means urging the variable pitch blades toward positions of maximum pitch with respect to the path of flow of the impelling fluid and resisting the decrease in pitch of said blades, pressure actuating means for exerting increased resistance to the decrease in pitch of said blades, fluid pressure transmitting means for establishing communication between said pressure actuating means and a source of pressure which varies with the speed of the fluid impelling rotor, and means controlled by a source of pressure which varies with the speed of the driven rotor for rendering operative said fluid pressure transmitting means when the speed of the driven rotor rises above a predetermined level in relation to the speed of the fluid impelling rotor and for rendering inoperative said fluid pressure transmitting means when the speed of the driven rotor falls below a predetermined level in relation to the speed of the fluid impelling rotor.

8. A fluid drive apparatus as set forth in claim 7 including normally closed valve means in said fluid pressure transmitting means which opens in response to a pressure above a predetermined level.

9. A fluid drive apparatus as set forth in claim 7 in which the variable pitch blades are carried by the driven rotor, and including blades carried by the fluid impelling rotor and means pivoting the variable pitch blades nearer their leading ends than their trailing ends, said pivots being spaced closely to the trailing ends of the blades carried by the fluid impelling rotor.

10. A fluid drive apparatus as set forth in claim 7 including an outer ring surrounding the variable pitch blades and carried by the same rotor, means pivoting the outer ends of the blades in said ring, means within said housing and surrounding the rotors to define an annular passage, and means defining a recess in said annular passage to accommodate the said ring.

11. In a hydraulic coupling including a housing containing a fluid therein, an impeller rotor carrying fluid impelling blades thereon, a turbine rotor having variable pitch blades thereon, and control means for varying the resistance to the decrease in pitch of said variable pitch blades with respect to the path of flow of the impelling fluid, said control means comprising means biasing the blades toward positions of increased pitch, pressure actuated means operating to increase the bias on said variable pitch blades, pressure transmitting means establishing communication between said pressure actuated means and the static fluid pressure at the impeller rotor, whereby an increase in said static pressure is transmitted to the pressure actuated means to operate the latter, valve means in said pressure transmitting means, and means communicating with and responsive to the difference in the static fluid pressures at said impeller rotor and said turbine rotor for opening said valve means when the static pressure at the turbine rotor is above a predetermined level in relation to the static pressure at the impeller rotor and for closing said valve means when the static pressure at the impeller rotor is below a predetermined level in relation to the static pressure at the turbine rotor.

12. In a hydraulic coupling as set forth in claim 11, control means which includes normally closed valve means in said fluid pressure transmitting means which opens in response to a pressure above a predetermined level.

13. In a hydraulic coupling as set forth in claim 11, control means which includes means for venting said pressure actuated means when said first-mentioned valve means is closed.

14. A fluid drive apparatus comprising a housing containing an impelling fluid, a fluid impelling rotor within said housing for circulating the fluid, a rotor driven by said impelling fluid, a plurality of variable pitch blades carried by one of said rotors, means mounting the variable pitch blades for movement such that the force of the fluid impelled by the impelling rotor tends to move the variable pitch blades toward positions of less pitch with respect to the path of flow of the impelling fluid, whereby an increase in the speed of the impelling rotor with the load on the driven rotor constant or an increase in the load on the driven rotor with the speed of the impelling rotor constant will produce a decrease in the pitch of the blades, yieldable means resisting movement of the variable pitch blades toward positions of decreased pitch with respect to the path of flow of the impelling fluid, means actuatable in response to an increase in the speed of the fluid impelling rotor when the speed of the driven rotor is above a predetermined level in relation to the speed of the fluid impelling rotor for exerting an increased force on the variable pitch blades which tends to increase the pitch thereof with respect to the path of flow of the impelling fluid.

References Cited by the Examiner
UNITED STATES PATENTS

| | | | |
|---|---|---|---|
| 2,162,543 | 6/39 | Banner | 60—54 |
| 2,380,074 | 7/45 | Roche | 60—54 |
| 2,471,179 | 5/49 | Wemp | 60—54 |
| 2,558,976 | 7/51 | O'Leary | 60—54 |
| 2,574,492 | 11/51 | Nowak | 60—54 |
| 2,587,154 | 2/52 | Hartz | 60—54 |
| 2,612,755 | 10/52 | Szczeniowski | 60—54 |
| 2,754,764 | 7/56 | Mead | 60—54 X |
| 2,909,034 | 10/59 | Jandasek | 60—54 |

JULIUS E. WEST, *Primary Examiner*.